Patented June 8, 1937

2,082,952

UNITED STATES PATENT OFFICE 2,082,952

ANTIDIABETIC SUBSTANCE

Charles E. Gruwell and Frank H. E. Preene, New York, N. Y., assignors to Research Agency Corporation, Oradel, N. J., a corporation of New Jersey No Drawing. Application May 16, 1933
Serial No. 671,364

4 Claims. (Cl. 167—55)

This invention relates to the treatment of pathological conditions resulting from a deficiency in carbohydrate metabolism in the corporeal system, especially diabetes mellitus, and more particularly to a new product for use in such treatment and to a method for preparing it.

It is known that when extracts from various animal tissues and pancreas are injected in patients suffering from diabetes, the sugar content of the blood is reduced. With such injections the reduction of sugar in the blood is temporary, requiring frequent injections to maintain normalcy. Furthermore, unless great care is used, the reduction in sugar by this treatment may be to below physiological normal, with the result that the patient will suffer from hypoglycemic shock. Such extracts are not administered by mouth because when so given they are destroyed or altered by the digestive juices of the stomach and before they reach the blood stream.

It is an object of the present invention to provide a product which may be administered by mouth and by which the carbohydrate content, including sugar and fats, of the blood of one suffering from a deficiency in carbohydrate metabolism, and particularly diabetes mellitus, may be reduced conveniently to and maintained at the physiological normal. It is a further object to provide such a product whereby the carbohydrate content may be reduced to normal without danger of reducing it to substantially below normal. Another object is to provide such a product whereby the carbohydrate content can be held at normal for a longer period of time. It is also an object to produce such a composition which may be administered without producing a toxic effect upon the body organism. A further object is to provide a method for producing the new product. Other objects will become apparent.

It has now been found that active principles for correcting a deficiency in carbohydrate metabolism, which we shall refer to as the antidiabetic principles, can be extracted from certain plant life and when so extracted may be administered by mouth to produce a controlled reduction of the carbohydrate content in the blood of patients suffering from such a deficiency, without producing a toxic effect upon the body organism.

In describing the invention, a detailed example will be given of a procedure we propose to use, although it is not intended by this description to restrict it to the particular example given or to the particular solvents, temperatures, proportions, etc. mentioned.

One part by weight of the fleshy branches or stems of the "Opuntia Phaeacantha" of the genus "Cactaceae," commonly called "prickly pear," is picked, ground and macerated with about four parts of hot water, the mixture being afterwards maintained at the boiling point for about 15 to 20 minutes to extract the active principles. The material is then cooled, strained and filtered to separate the extraneous material, after which it is concentrated by heating it under less than atmospheric pressure at a temperature of about 75° C. until it is concentrated to about one-quarter of its volume.

The resulting solution, when cooled, is administered to the patient by mouth, the quantity administered depending upon the pathological status of the patient. An overdose of the product is not significant, since it will not reduce the blood carbohydrates to substantially below normal or have toxic effects. The blood sugar of a person treated in this manner is reduced more slowly than when using insulin, but when reduced to normal it is maintained there without subsequent treatment for a much longer period of time.

In selecting prickly pears, it is preferable to select ones which have been subjected to intense solar radiation, since the action of this radiation apparently conserves energy within the plant organism. Also, just after the plant has been exposed to the maximum of solar radiation, as during the summer months, it gives a more active and effective product. It is preferred to use plants grown at relatively high altitudes where the cosmic rays are more intense.

The extract prepared as described above is a colloidal solution and contains large quantities of pentoses and pentosans, together with certain minerals such as magnesium, nickel and iron, etc., in complex molecular combination. These pentoses, when administered to the human body, together with the metallic catalysts contained therein, are apparently converted into a guanylic acid containing the pentose group as differentiated from the nucleotide of the animal tissues which contain a hexose group. This solution may be preserved by adding suitable preserving agents, such as ethyl alcohol or benzoic acid.

The extract described above may also be mixed with extracts from other plants and fruits which have been subjected to intense solar radiation.

Although particular reference has been made to an extraction from the branches of the prickly pear, other portions of the plant, or portions of other species of the genus cactaceae, or of other plants subjected to intense solar radiation, may be used.

Cold water and other solvents, which do not destroy the active principles of the extract, may be used in place of the hot water extraction referred to above.

Reference has been made to the administration of the product to the patient by mouth, but it is not restricted to such use and may be given by injection, as is insulin. In such a case the product is evaporated to a higher concentration.

The terms used in describing the invention have been used in their descriptive sense and not as terms of limitation and it is intended that all equivalents thereof be included within the scope of the description and the appended claims. In referring to the anti-diabetic principle, it is intended not to restrict it to principles effective only against diabetes, but to include principles effective in correcting other pathological conditions associated with a deficiency in carbohydrate metabolism.

What we claim is:

1. A product capable of reducing carbohydrates in the blood stream of a patient suffering from a deficiency in carbohydrate metabolism, comprising an extract of anti-diabetic principles from the prickly pear.

2. An anti-diabetic substance comprising a hot water extract of prickly pear.

3. An anti-diabetic substance comprising a hot water extract of prickly pear harvested during the portion of the year in which it is subjected to the highest solar intensity.

4. A non-toxic anti-diabetic substance comprising an extract of prickly pear containing the active principles which reduce blood sugar in the system of a patient suffering from a deficiency in carbohydrate metabolism.

CHARLES E. GRUWELL.
FRANK H. E. PREENE.